United States Patent
Ren et al.

(10) Patent No.: US 11,396,065 B2
(45) Date of Patent: Jul. 26, 2022

(54) COMPOSITE BRAZE LINER FOR LOW TEMPERATURE BRAZING AND HIGH STRENGTH MATERIALS

(71) Applicant: ARCONIC TECHNOLOGIES LLC, Pittsburgh, PA (US)

(72) Inventors: Baolute Ren, Lititz, PA (US); Michael P. Danz, Lancaster, PA (US); Marvin Goins, Columbia, PA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 0 days.

(21) Appl. No.: 16/992,553

(22) Filed: Aug. 13, 2020

(65) Prior Publication Data

US 2020/0368852 A1    Nov. 26, 2020

Related U.S. Application Data

(63) Continuation of application No. PCT/US2018/019120, filed on Feb. 22, 2018.

(51) Int. Cl.
*B32B 15/01* (2006.01)
*B23K 35/02* (2006.01)
(Continued)

(52) U.S. Cl.
CPC ............ *B23K 35/0238* (2013.01); *B23K 1/19* (2013.01); *B23K 35/286* (2013.01);
(Continued)

(58) Field of Classification Search
None
See application file for complete search history.

(56) References Cited

U.S. PATENT DOCUMENTS 5,069,980 A * 12/1991 Namba ................. B32B 15/016
428/654
8,455,110 B2 * 6/2013 Wittebrood .......... B23K 35/002
428/654
(Continued)

FOREIGN PATENT DOCUMENTS

EP   2323805 B1   2/2012
EP   3563968 A1   11/2019
(Continued)

OTHER PUBLICATIONS

O'Brien, Annette Sinnes, Kathy. (2015). Welding Handbook, vol. 5—Materials and Applications, Part 2 (9th Edition). Chapter 1, pp. 1-70, American Welding Society (AWS) (Year: 2015).*
(Continued)

*Primary Examiner* — Daniel J. Schleis
(74) *Attorney, Agent, or Firm* — K&L Gates LLP (57) ABSTRACT

An apparatus, material and method for forming a brazing sheet has a composite braze liner layer of low melting point aluminum alloy and 4000 series braze liner. The low melting point layer of the composite braze liner facilitates low temperature brazing and decrease of the diffusion of magnesium from the core into the composite braze liner. The reduction of magnesium diffusion also lowers the formation of associated magnesium oxides at the braze joint interface that are resistant to removal by Nocolok flux, thereby facilitating the formation of good brazing joints through the use of low temperature controlled atmosphere brazing (CAB) and Nocolok flux. The apparatus also enables the production of brazing sheet materials with high strength and good corrosion property.

9 Claims, 8 Drawing Sheets

(51) Int. Cl.
  B23K 35/28    (2006.01)
  C22C 21/10    (2006.01)
  C22C 21/02    (2006.01)
  B23K 1/19     (2006.01)
  C22C 21/14    (2006.01)
  C22C 21/16    (2006.01)
  C22C 21/08    (2006.01)
  B23K 103/10   (2006.01)

(52) U.S. Cl.
  CPC .......... B23K 35/288 (2013.01); B32B 15/016 (2013.01); C22C 21/02 (2013.01); C22C 21/08 (2013.01); C22C 21/10 (2013.01); C22C 21/14 (2013.01); C22C 21/16 (2013.01); *B23K 2103/10* (2018.08); *Y10T 428/12764* (2015.01)

(56) References Cited

U.S. PATENT DOCUMENTS

| | | |
|---|---|---|
| 2003/0098338 A1 | 5/2003 | Dockus et al. |
| 2003/0189082 A1 | 10/2003 | Dockus et al. |
| 2010/0159272 A1 | 6/2010 | Marois et al. |
| 2011/0111254 A1* | 5/2011 | Wittebrood ........ B23K 35/0222 428/654 |
| 2017/0291264 A1* | 10/2017 | Kirkham ............... F28F 21/084 |

FOREIGN PATENT DOCUMENTS

| | | |
|---|---|---|
| JP | 9225677 | 9/1997 |
| JP | 2013146756 | 8/2013 |
| JP | 2014155955 | 8/2014 |
| JP | 2014155955 A | 8/2014 |
| JP | 2018103260 | 7/2018 |
| WO | 02/055256 A1 | 7/2002 |
| WO | 02090031 A2 | 11/2002 |

OTHER PUBLICATIONS

International Search Report and Written Opinion of the International Searching Authority for International Application No. PCT/US2018/019120 dated Nov. 14, 2018.

International Preliminary Report on Patentability of the International Searching Authority for International Application No. PCT/US2018/019120 dated Aug. 27, 2020.

Extended European Search Report for European Application No. 18907373 dated Sep. 22, 2021, 10 pages.

* cited by examiner

COMPOSITE BRAZE LINER FOR LOW TEMPERATURE BRAZING AND HIGH STRENGTH MATERIALS

CROSS-REFERENCE TO RELATED APPLICATION

This application is a continuation of International Patent Application No. PCT/US2018/019120, filed Feb. 22, 2018, entitled "COMPOSITE BRAZE LINER FOR LOW TEMPERATURE BRAZING AND HIGH STRENGTH MATERIALS", which is incorporated herein by reference in its entirety.

FIELD

The present invention relates to apparatus and methods for making heat exchangers and more particularly, to materials used for making heat exchangers from aluminum alloy brazing sheet that is formed into heat exchanger components and unified into an assembly by brazing.

BACKGROUND

Various apparatus, materials and methods for making heat exchangers are known. Aluminum heat exchangers, such as radiators, condensers, heater cores, etc. are mainly assembled using brazing technologies, including controlled atmosphere brazing (CAB) and vacuum brazing. In the brazing process, a braze liner layer of a composite brazing sheet is melted by exposure to high temperatures, e.g., in a furnace, and serves as filler metal to form a braze joint between the heat exchanger components, such as tube and header, tube and fin, etc.

Low temperature brazing has been proposed using a single layer of braze alloy liner with a low melting temperature, but this has negative implications on workability, corrosion performance, joint strength, hardness, brittleness, and difficulty in roll bonding. Notwithstanding known methods, materials and apparatus, alternative methods, apparatus and materials for making heat exchangers remain desirable.

SUMMARY

The disclosed subject matter relates to a sheet material, having: a core of 2XXX, 3XXX, 5XXX or 6XXX aluminum alloy; a composite braze liner with a layer of low melting point aluminum alloy and a layer of 4XXX aluminum alloy.

In another embodiment, the low melting point aluminum alloy has a melting point lower than the 4XXX aluminum alloy.

In another embodiment, the 4XXX aluminum alloy is disposed on the core and the low melting point aluminum alloy is disposed on the 4XXX aluminum alloy distal to the core.

In another embodiment, the low melting point aluminum alloy is disposed on the core and the 4XXX aluminum alloy is disposed on the low melting point aluminum alloy distal to the core.

In another embodiment, the 4XXX aluminum alloy includes a first layer of 4XXX aluminum alloy and a second layer of 4XXX aluminum alloy and wherein the first layer of 4XXX aluminum alloy is disposed on the core and the low melting point aluminum alloy is disposed on the first layer of 4XXX aluminum alloy distal to the core and wherein the second layer of 4XXX aluminum alloy is disposed on the low melting point aluminum alloy distal to the first layer of 4XXX aluminum alloy.

In another embodiment, further including at least one distal layer of aluminum alloy disposed on the core on a side distal to the composite braze liner.

In another embodiment, the at least one distal layer is a layer of 4XXX aluminum alloy.

In another embodiment, the at least one distal layer is a second composite braze liner.

In another embodiment, the at least one distal layer is a waterside liner.

In another embodiment, the waterside liner is 7XXX aluminum alloy with zinc in a range of 1.0 to 15 wt. %.

In another embodiment, the low melting point aluminum alloy has a melting point in the range of 510° C. to 560° C.

In another embodiment, the low melting point aluminum alloy comprises: 4.0-12.0 wt. % Si, 0.1-1.0 wt. % Fe, 1.0-5.0 wt. % Cu and 5.0-20.0 wt. % Zn.

In another embodiment, the low melting point aluminum alloy has a solidus in the range of 510° C. to 560° C. and a liquidus of 565° C. to 585° C.

In another embodiment, the amount of Si in the low melting point aluminum alloy is in the range of 4 to 9 wt. %.

In another embodiment, the amount of Zn in the low melting point aluminum alloy is in the range of 6 to 18 wt. %.

In another embodiment, the composite braze liner comprises: 4.0-12.0 wt. % Si, 0.1-1.0 wt. % Fe, ≤2.0 wt. % Cu, 1.0-6.0 wt. % Zn and wherein the composite braze liner has a solidus of 515° C. to 575° C. and a liquidus of 565° C. to 595° C.

In another embodiment, the composite braze liner comprises: 10.0-10.5 wt. % Si, 0.15-2.0 wt. % Fe, ≤0.7 wt. % Cu, ≤4.0-6.0 wt. % Zn and wherein the composite braze liner has a solidus of 550° C. to 575° C. and a liquidus of 575° C. to 590° C.

In another embodiment, the core comprises: 0.10-1.2 wt. % Si, 0.15-0.5 wt. % Fe, 0.40-3.5 wt. % Cu, 0.10-1.8 wt. % Mn, 0.20-1.85 wt. % Mg, ≤0.01 wt. % Cr, ≤0.20 wt. % Zn and ≤0.20 wt. % Ti and wherein the core has a solidus of >590° C. and a liquidus >650° C.

In another embodiment, the core comprises: 0.10-0.90 wt. % Si, 0.15-0.5 wt. % Fe, 0.40-2.60 wt. % Cu, 0.10-1.55 wt. % Mn, 0.20-1.0 wt. % Mg, ≤0.01 wt. % Cr, ≤0. 0.20 wt. % Zn and ≤0.20 wt. % Ti and wherein the core has a solidus >590° C. and a liquidus >650° C.

In another embodiment, the core includes at least one strengthening element selected from Si, Cu, Mn and Mg.

In another embodiment, the Mg present in the core, pre-braze is in the amount of 0.2 to 1.85 wt. %, the Cu is in the amount of 0.4 to 3.5 wt. %, the Mn is in the amount of 0.1 to 1.8 wt. %, the Si is in the amount of 0.1 to 1.2 wt. %.

In another embodiment, the clad ratio of the composite braze liner to the core is in the range of 4 to 18%.

In another embodiment, the ratio of a thickness of the low melting point aluminum alloy to a thickness of the 4XXX aluminum alloy in the composite braze liner is the range of 5 to 50%.

In another embodiment, the LPM liner and 4000 liner are roll bonded and prepared separately and then roll bonded with the core, or the LPM liner, 4000 liner, core and/or waterside liner are roll bonded in the same process.

In another embodiment, the low melting point aluminum alloy has a temperature at which melting begins in the range of 510 to 560° C. and a temperature at which melting is complete in the range of 565 to 585° C.

In another embodiment, the Zn present in the low melting point aluminum alloy in a pre-braze condition is distributed into the 4XXX aluminum alloy adjacent thereto and into the core in a post braze condition.

In another embodiment, a residue of the low melting point aluminum alloy in a post braze condition forms an anodic corrosion resistant layer protective of the core.

In another embodiment, the corrosion resistant layer has a corrosion potential difference in a range of 15 to 150 mV between the surface and the core.

In another embodiment, the sheet material is formed into a first part and further comprising a second sheet material formed of an aluminum alloy, the first part brazed to the second part to form an assembly.

In another embodiment, the assembly is a heat exchanger.

In another embodiment, a method for brazing, includes the steps of:

providing a part formed from a sheet material having a core of 2XXX, 3XXX, 5XXX or 6XXX aluminum alloy and a composite braze liner, having a layer of low melting point aluminum alloy and a layer of 4XXX aluminum alloy; providing a second part formed from an aluminum alloy; placing the first part in contact with the second part; heating the first part and the second part; melting the low melting point aluminum alloy before the 4XXX aluminum alloy melts; melting the 4XXX aluminum alloy and forming a mixed molten alloy of the low melting point aluminum alloy and the 4XXX aluminum alloy; forming a braze joint between the first part and the second part from the mixed molten alloy; and allowing the mixed molten alloy to cool.

In another embodiment, the step of heating is conducted in a controlled atmosphere and further comprising the step of applying a Nocolok flux to at least one of the first part and the second part to remove oxides from a surface thereof.

In another embodiment, the maximum temperature is maintained for less than 5 minutes.

In another embodiment, the low melting point aluminum alloy begins melting at a temperature less than 560° C.

In another embodiment, the core has a composition including at least one of 0.2 to 1.0 wt. % Mg, 0.4 to 2.6 wt. % Cu and or 0.1 to 1.0 wt. % Si.

In another embodiment, the step of diffusing includes diffusing Si, Cu, Zn into the 4XXX aluminum alloy, reducing the temperature at which the 4XXX aluminum alloy melts.

In another embodiment, a sheet material, includes: a core of 2XXX, 3XXX, 5XXX or 6XXX aluminum alloy; a composite braze liner, having: a layer of low melting point aluminum alloy and a layer of 4XXX aluminum alloy, wherein the low melting point aluminum alloy has a melting point lower than the 4XXX aluminum alloy.

In another embodiment, wherein the 4XXX aluminum alloy is disposed on the core and the low melting point aluminum alloy is disposed on the 4XXX aluminum alloy distal to the core or wherein the low melting point aluminum alloy is disposed on the core and the 4XXX aluminum alloy is disposed on the low melting point aluminum alloy distal to the core or wherein the 4XXX aluminum alloy includes a first layer of 4XXX aluminum alloy and a second layer of 4XXX aluminum alloy and wherein the first layer of 4XXX aluminum alloy is disposed on the core and the low melting point aluminum alloy is disposed on the first layer of 4XXX aluminum alloy distal to the core and wherein the second layer of 4XXX aluminum alloy is disposed on the low melting point aluminum alloy distal to the first layer of 4XXX aluminum alloy.

In another embodiment, the sheet material of any of the foregoing embodiments, further includes at least one distal layer of aluminum alloy disposed on the core on a side distal to the composite braze liner and/or wherein the at least one distal layer is a layer of 4XXX aluminum alloy, and/or wherein the at least one distal layer is a second composite braze liner, and/or wherein the at least one distal layer is a waterside liner, and/or wherein the waterside liner is 7XXX aluminum alloy with zinc in a range of 1.0 to 15 wt. %.

In another embodiment, the sheet material of any of the foregoing embodiments, wherein the low melting point aluminum alloy has a melting point in the range of 510° C. to 560° C.

In another embodiment, the sheet material of any of the foregoing embodiments, wherein the low melting point aluminum alloy comprises: 4.0-12.0 wt. % Si, 0.1-1.0 wt. % Fe, 1.0-5.0 wt. % Cu and 5.0-20.0 wt. % Zn and/or wherein the low melting point aluminum alloy has a solidus in the range of 510° C. to 560° C. and a liquidus of 565° C. to 585° C. and/or wherein the amount of Si in the low melting point aluminum alloy is in the range of 4 to 9 wt. % and/or wherein the amount of Zn in the low melting point aluminum alloy is in the range of 6 to 18 wt. %.

In another embodiment, the sheet material of any of the foregoing embodiments, wherein the composite braze liner comprises: 4.0-12.0 wt. % Si, 0.1-1.0 wt. % Fe, ≤2.0 wt. % Cu, 1.0-6.0 wt. % Zn and wherein the composite braze liner has a solidus of 515° C. to 575° C. and a liquidus of 565° C. to 595° C. or wherein the composite braze liner comprises: 10.0-10.5 wt. % Si, 0.15-2.0 wt. % Fe, ≤0.7 wt. % Cu, ≤4.0-6.0 wt. % Zn and wherein the composite braze liner has a solidus of 550° C. to 575° C. and a liquidus of 575° C. to 590° C.

In another embodiment, the sheet material of any of the foregoing embodiments, wherein the core comprises: 0.10-1.2 wt. % Si, 0.15-0.5 wt. % Fe, 0.40-3.5 wt. % Cu, 0.10-1.8 wt. % Mn, 0.20-1.85 wt. % Mg, ≤0.01 wt. % Cr, ≤0.20 wt. % Zn and ≤0.20 wt. % Ti and wherein the core has a solidus of >590° C. and a liquidus >650° C. or wherein the core comprises: 0.10-0.90 wt. % Si, 0.15-0.5 wt. % Fe, 0.40-2.60 wt. % Cu, 0.10-1.55 wt. % Mn, 0.20-1.0 wt. % Mg, ≤0.01 wt. % Cr, ≤0.20 wt. % Zn and ≤0.20 wt. % Ti and wherein the core has a solidus >590° C. and a liquidus >650° C.

In another embodiment, the sheet material of any of the foregoing embodiments, wherein the core comprises at least one strengthening element selected from Si, Cu, Mn and Mg and/or wherein the Mg present in the core, pre-braze is in the amount of 0.2 to 1.85 wt. %, the Cu is in the amount of 0.4 to 3.5 wt. %, the Mn is in the amount of 0.1 to 1.8 wt. %, the Si is in the amount of 0.1 to 1.2 wt. %.

In another embodiment, the sheet material of any of the foregoing embodiments, wherein the clad ratio of the composite braze liner to the core is in the range of 4 to 18% and/or wherein the ratio of a thickness of the low melting point aluminum alloy to a thickness of the 4XXX aluminum alloy in the composite braze liner is the range of 5 to 50% and or wherein the LPM liner and 4000 liner are roll bonded and prepared separately and then roll bonded with the core, or the LPM liner, 4000 liner, core and/or waterside liner are roll bonded in the same process.

In another embodiment, the sheet material of any of the foregoing embodiments, wherein the low melting point aluminum alloy has a temperature at which melting begins in the range of 510 to 560° C. and a temperature at which melting is complete in the range of 565 to 585° C.

In another embodiment, the sheet material of any of the foregoing embodiments, wherein the Zn present in the low melting point aluminum alloy in a pre-braze condition is distributed into the 4XXX aluminum alloy adjacent thereto and into the core in a post braze condition and/or wherein a residue of the low melting point aluminum alloy in a post braze condition forms an anodic corrosion resistant layer protective of the core and/or wherein the corrosion resistant layer has a corrosion potential difference in a range of 15 to 150 mV between the surface and the core.

In another embodiment, the sheet material of any of the foregoing embodiments, wherein the sheet material is formed into a first part and further comprising a second sheet material formed of an aluminum alloy, the first part brazed to the second part to form an assembly and/or wherein the assembly is a heat exchanger.

In another embodiment, a method for brazing, includes the steps of:

providing a part formed from a sheet material having a core of 2XXX, 3XXX, 5XXX or 6XXX aluminum alloy and a composite braze liner, having a layer of low melting point aluminum alloy and a layer of 4XXX aluminum alloy; providing a second part formed from an aluminum alloy; placing the first part in contact with the second part; heating the first part and the second part; melting the low melting point aluminum alloy before the 4XXX aluminum alloy melts; melting the 4XXX aluminum alloy and forming a mixed molten alloy of the low melting point aluminum alloy and the 4XXX aluminum alloy; forming a braze joint between the first part and the second part from the mixed molten alloy; and allowing the mixed molten alloy to cool.

In another embodiment, the method of any of the foregoing embodiment, wherein the step of heating is conducted in a controlled atmosphere and further comprising the step of applying a Nocolok flux to at least one of the first part and the second part to remove oxides from a surface thereof.

In another embodiment, the method of any of the foregoing embodiments, wherein the maximum temperature is maintained for less than 5 minutes and/or wherein the low melting point aluminum alloy begins melting at a temperature less than 560° C.

In another embodiment, the method of any of the foregoing embodiments, wherein the core has a composition including at least one of 0.2 to 1.0 wt. % Mg, 0.4 to 2.6 wt. % Cu and or 0.1 to 1.0 wt. % Si and/or wherein the step of diffusing includes diffusing Si, Cu, Zn into the 4XXX aluminum alloy, reducing the temperature at which the 4XXX aluminum alloy melts.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Heat exchanger structures may be formed from aluminum alloy sheet material that has at least two layers, viz., a core layer, e.g., of 2000, 3000, 5000 or 6000 series aluminum as a base alloy and a braze layer/braze liner formed from, e.g., a 4000 series base alloy. This type of material may be described as a brazing sheet. Prior to assembling the heat exchanger structure through brazing, the braze layer surface may have developed a layer of oxide film, such as Al oxide, Mg oxide, etc., e.g., through the fabrication process and exposure to the atmosphere. The oxide layer is removed prior to or during the brazing process to ensure that the filler metal "wets" and bridges the surfaces to be joined to produce good joints without an oxide barrier between the joined elements contaminating and compromising the joint. The present disclosure recognizes that in a vacuum braze process, the undesirable oxide layer is broken up by the evaporation of Mg present either in the braze liner or the core of the brazing sheet. Mg is an important alloying element in aluminum alloy brazing sheets that increases the strength of the material, so the vacuum braze process can take advantage of the presence of Mg in the brazing sheet to remove the oxide on the component surface and strengthen the resultant brazed heat exchanger assembly.

In controlled atmosphere brazing (CAB) process, the brazing is conducted in an inert gas atmosphere that largely excludes ambient oxygen, thus cutting down on oxides formed during the brazing process. Pre-existing oxide film(s) that are present on the brazing sheet are removed by a flux, such as a Nocolok flux. The flux can dissolve the oxide film on the surface of the brazing sheet and promote wettability of the surfaces to be joined. Nocolok flux has limited solubility of Mg oxide and limited ability to remove Mg oxide. In addition, Mg diffused to the surface during the brazing process can react with F and K in the flux, which can change the flux composition by forming $MgF_2$, $KMgF_3$, and $K_2MgF_4$, raising the flux melting point and having a negative impact on removing oxide film. A Cs containing Nocolok flux has been developed for aluminum alloys containing Mg, such as 6063. Cs flux can effectively break and remove the MgO film and therefore ensure good brazeability of Mg-containing brazing sheet, but it is about 3 times more expensive than Nocolok flux and therefore is not preferred over Nocolok by heat exchanger manufactures. Consequently, Mg containing aluminum alloys are not widely used for making heat exchangers made by CAB processes.

An aspect of the present disclosure is a composite braze liner (CBL) that enables Mg-containing aluminum alloys to be braze assembled using Nocolok flux in a CAB process. More particularly, the CBL includes a layer of low melting point (LMP) aluminum alloy bonded to a 4XXX braze liner. When subjected to heating in the CAB furnace, the LMP layer will melt at a lower temperature before the 4XXX braze liner melts during the brazing process. The resultant liquid metal from the LMP layer can then accelerate Si diffusion in the LMP alloy and the adjacent 4XXX liner. In addition, alloying elements, such as Cu and Zn diffused from the LMP alloy into the 4XXX braze liner can lower the melting point of the 4XXX liner. Both of these factors can speed up the melting and flowing of the 4XXX braze liner filler metal, such that the brazing process can be completed quickly at a lower temperature range, e.g., from about 565° C. to 590° C., compared to the conventional temperature range of 577° C. to 613° C. of a CAB brazing process widely used today. In one embodiment, the upper limit of the lowered temperature range in accordance with the present disclosure is less than 577° C. The LMP also has the positive impact of reducing the length of time needed for brazing, e.g., from about 25 to 45 minutes for a conventional processes to a reduced time of about 15 to 30 minutes in accordance with an embodiment of the present disclosure. In one embodiment, the length of time for brazing in accordance with the present disclosure is less than 25 minutes. A quick braze process at a low temperature range can reduce Mg diffusion to the surfaces of the brazing sheet components to be joined, such that the adverse effect of Mg on brazeability can be reduced, i.e., by reducing MgO formation and the reaction of Mg with the Nocolok flux. The present disclosure therefore enables heat exchanger components made from Mg-containing aluminum alloys to be brazed using Nocolok flux in a CAB process. In addition, a brazing process conducted at a low braze temperature enables use of other alloying elements in the core alloy, such as Si, Cu, etc., which lower solidus temperature of the core to a level, e.g., <590° C. that would not withstand the temperatures required for conventional CAB brazing without melting. The present disclosure therefore enables CAB brazing of components, e.g., tubes, tanks and/or fins of heat exchangers, made from high strength brazing sheet materials.

The new materials enabled to be joined by CAB in accordance with the present disclosure will include high strength materials, e.g., for the core, such as those containing considerable amounts of magnesium, e.g., in the range of 0.3 to 1.0 wt. %, or even higher, e.g., up to 1.85 wt %. High strength materials permit thinner gauge brazing sheet to be used, resulting in lighter, high performance heat exchangers. The CBL compositions and clad ratios disclosed in the present disclosure can be selected such that the LMP layer, after melting and mixing with the 4XXX brazing layer, can form a protective layer to prevent corrosion of the core during use, e.g., as an automobile radiator or the like. A brazing sheet in accordance with the present disclosure also enables heat exchanger manufacturers to use a low temperature brazing process, which is easier to control and saves energy and production costs.

Figure 1A:
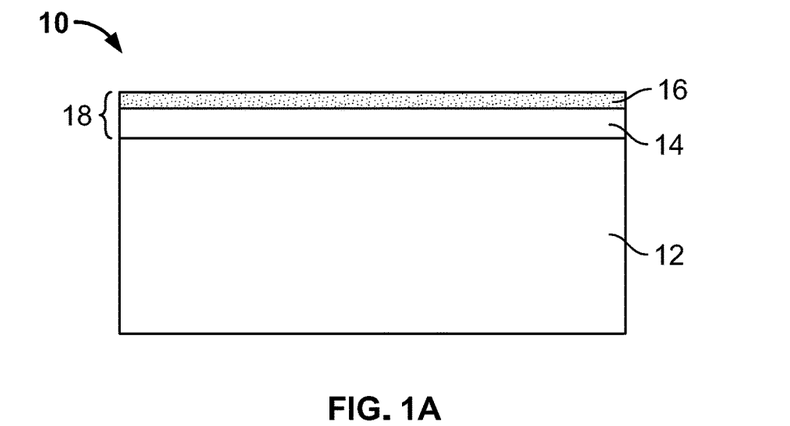
FIG. 1A is a diagrammatic view of a brazing sheet in accordance with an embodiment of the present disclosure.

FIG. 1A shows a brazing sheet material 10 with a core 12 having a base composition of 2000, 3000, 5000 or 6000 series aluminum alloy, a braze liner (layer) 14 having a base composition of 4XXX (4000) series aluminum alloy and an LMP (low melting point) layer (liner) 16. The combination of the braze liner 14 and LMP layer 16 can be identified as the components of a composite braze liner (CBL) 18. In FIG. 1A, the LMP layer 16 is an outer liner/layer disposed on top of the 4XXX braze liner 14 on a first side of the core 12. On the second side of the core 12, another CBL 18, a single braze liner, or a waterside liner may be present, or no liner may be present, depending upon the application. The waterside liner may be a 7000 alloy or a 3000 series alloy with added Zn, e.g., 1.0 to 15.0 wt. % added Zn.

Figure 1B:
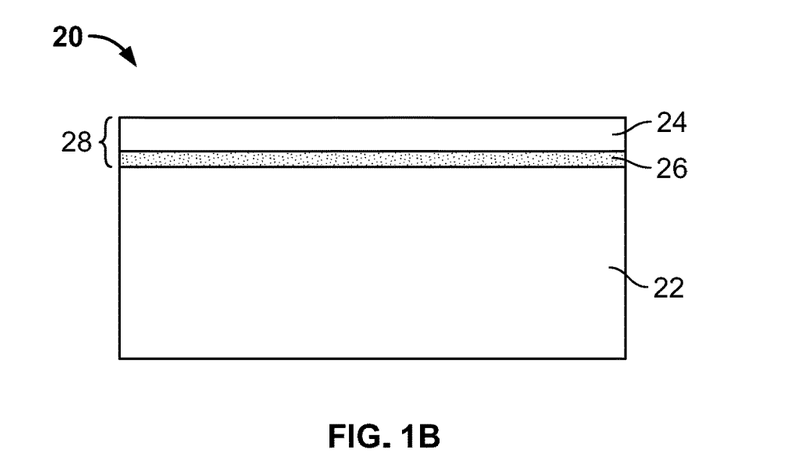
FIG. 1B is a diagrammatic view of a brazing sheet in accordance with another embodiment of the present disclosure.

FIG. 1B shows a brazing sheet material 20 like the brazing sheet material 10 of FIG. 1A, having a core 22 and a braze liner 24, but where the LMP layer 26 is positioned between the core 22 and the 4XXX braze liner 24, resulting in a CBL 28 having a reversed orientation relative to that of the CBL 18 in FIG. 1A. Due to the orientation and position of the CBL 28, the LMP layer 26 can be described as an interliner between the 4XXX braze liner 24 and the core 22. Similarly, on the second side of the core 22, another CBL 28, a single braze liner, a waterside liner, or no liner may be present, depending upon the application.

Figure 1C:
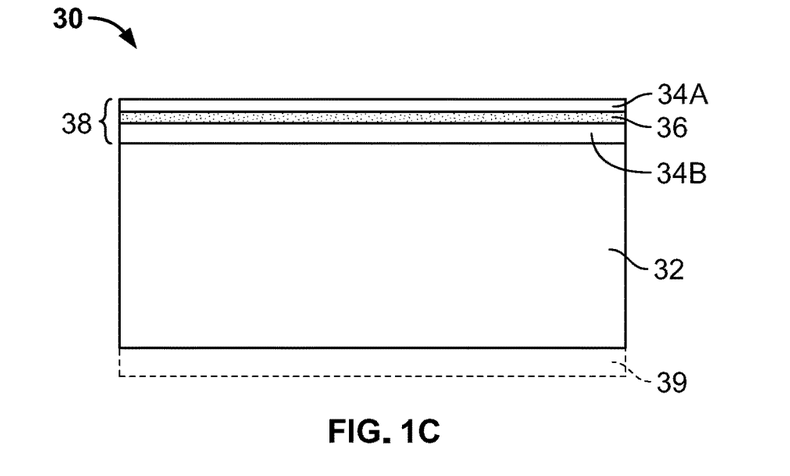
FIG. 1C is a diagrammatic view of a brazing sheet in accordance with another embodiment of the present disclosure.

FIG. 1C shows a brazing sheet material 30 like the brazing sheet materials 10 and 20 of FIGS. 1A and 1B, having a core 32, and a two part braze liner 34A, 34B, where the LMP layer 36 is positioned between the two parts of the braze liner 34A, 34B, such that the CBL 38 has three layers. Optional layer 39, shown in dashed lines may be provided on the core 32 opposite to the CBL 38 and may be another CBL like CBL 38, 28 or 18, an anodic layer for corrosion protection, an anodic layer covered by a CBL 18, 28, 38 or be absent (no clad layer on this side of the core), depending upon the application.

Exemplary LMP alloys, such as would be used in layers 16, 26 and/or 36, combined with a 4000 series braze liner 14, 24, 34A, 34B in this instance, a 4047 alloy, were tested as shown in Table 1 expressed in weight percent, with an aluminum remainder. The solidus and liquidus shown were calculated based on the compositions of the respective alloys in Table 1.

TABLE 1

Compositions of Low Melting Point Alloys

| Alloy | Si | Fe | Cu | Mn | Mg | Cr | Zn | Ti | Solidus (° C.) | Liquidus (° C.) |
|---|---|---|---|---|---|---|---|---|---|---|
| L1 | 5.1 | 0.12 | 2.0 | 0.09 | 0.01 | 0.01 | 19.9 | 0.01 | 516 | 577 |
| L2 | 5.1 | 0.16 | 2.4 | 0.10 | 0.01 | 0.01 | 15.0 | 0.01 | 522 | 588 |
| L3 | 11.95 | 0.25 | 0.002 | 0.002 | 1.01 | 0.001 | 9.96 | 0.02 | 525 | 579 |
| L4 | 4.8 | 0.91 | 1.5 | 0.09 | 0.005 | 0.005 | 14.0 | 0.01 | 528 | 608 |
| L5 | 4.9 | 0.91 | 1.5 | 0.09 | 0.005 | 0.005 | 19.0 | 0.01 | 522 | 618 |
| 4047 | 11-13 | 0.8 | 0.3 | 0.15 | 0.10 | — | 0.20 | — | 577 | 582 |

All of the LMP layer compositions of Table 1 have a low solidus and liquidus that initiates the melting of the composite braze liner (CBL) 18, 28, 38 at a low temperature. The liquefied metal of the LMP layer 16, 26, 36 can accelerate Si diffusion and melting. The alloying elements of the LMP layer, 16, 26, 36, including but not limited to, Zn and Cu can diffuse into the adjacent 4XXX liner 14, 24, 34A, 34B, such that the whole composite braze liner CBL 18, 28, 38 can melt quickly at a temperature lower than a conventional 4XXX braze liner. The LMP layer 16, 26, 36 must have good workability and similar metal flow in the rolling process as the braze layer 14, 24, 34A, 34B, such that they both deform in a similar way and otherwise exhibit compatibility during rolling to gauge. In addition, the clad ratio of the composite braze liner (CBL) is selected such that, after melting, the resultant composition of the CBL 18, 28, 38 (that is the mixture of LMP liner and 4XXX liner) forms good braze joints with good strength and corrosion properties comparable to the braze joint formed by a 4XXX liner alone. In accordance with the present disclosure, the composite liner (CBL) residue that remains after brazing provides corrosion protection to the core to ensure good service life of the heat exchanger.

In one embodiment, the LMP layer may have a composition with 4.0-12.0 wt. % Si, 0.1-1.0 wt. % Fe, ≤5.0 wt. % Cu, ≤0.1 wt. % Mn, ≤0.01 wt. % Cr, 5.0-20.0 wt. % Zn and ≤0.02 wt. % Ti and a solidus in the range of 510° C. to 560° C. and a liquidus of 565° C. to 585° C.

In another embodiment, the amount of Si in the low melting point aluminum alloy is in the range of 4 to 9 wt. %. In another embodiment the amount of Zn in the low melting point aluminum alloy is in the range of 6 to 18 wt. %.

Table 2 shows two exemplary compositions CBL1 and CBL2 resulting from the combination of the LMP alloys L1 and L2 from Table 1) with a 4047 liner expressed in weight percent, aluminum remainder. The compositions CBL1 and CBL2 were determined based on calculation without taking diffusion into account and the solidus and liquidus are calculated based on the as-cast compositions.

In one embodiment, the CBL may have a composition having 4.0-12.0 wt. % Si, 0.1-1.0 wt. % Fe, ≤2.0 wt. % Cu, ≤0.1 wt. % Mn, 1.0-6.0 wt. % Zn and wherein the composite braze liner has a solidus of 515° C. to 575° C. and a liquidus of 565° C. to 595° C.

In another embodiment, the composite braze liner has: 10.0-10.5 wt. % Si, 0.15-1.0 wt. % Fe, ≤1.0 wt. % Cu, ≤0.1 wt. % Mn, 4.0-6.0 wt. % Zn and wherein the composite braze liner has a solidus of 550° C. to 575° C. and a liquidus of 575° C. to 590° C.

Figure 2A:
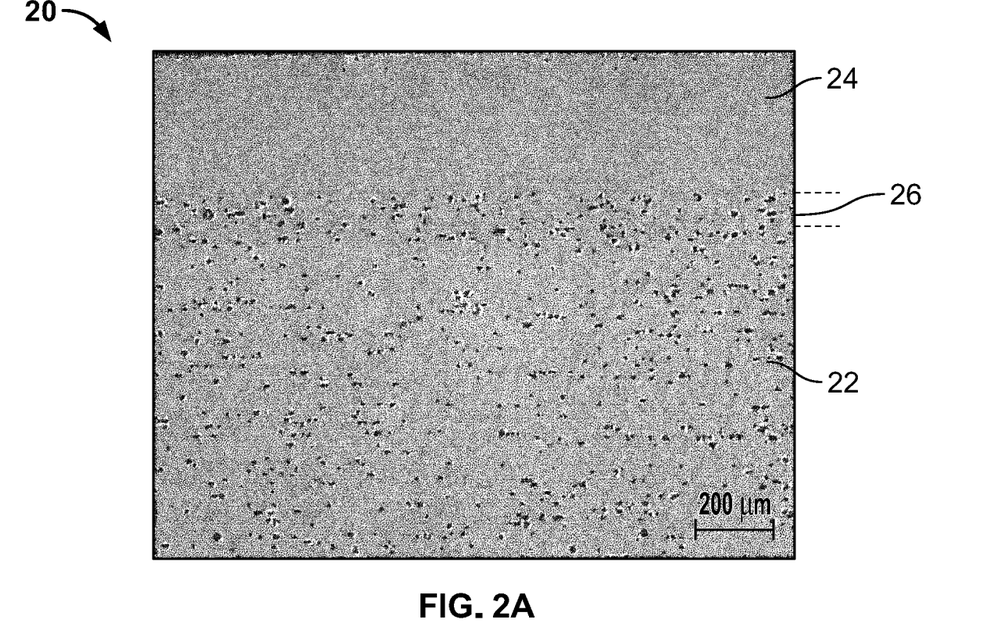
FIG. 2A is a cross-sectional view of a brazing sheet in accordance with an embodiment of the present disclosure.
Figure 2B:
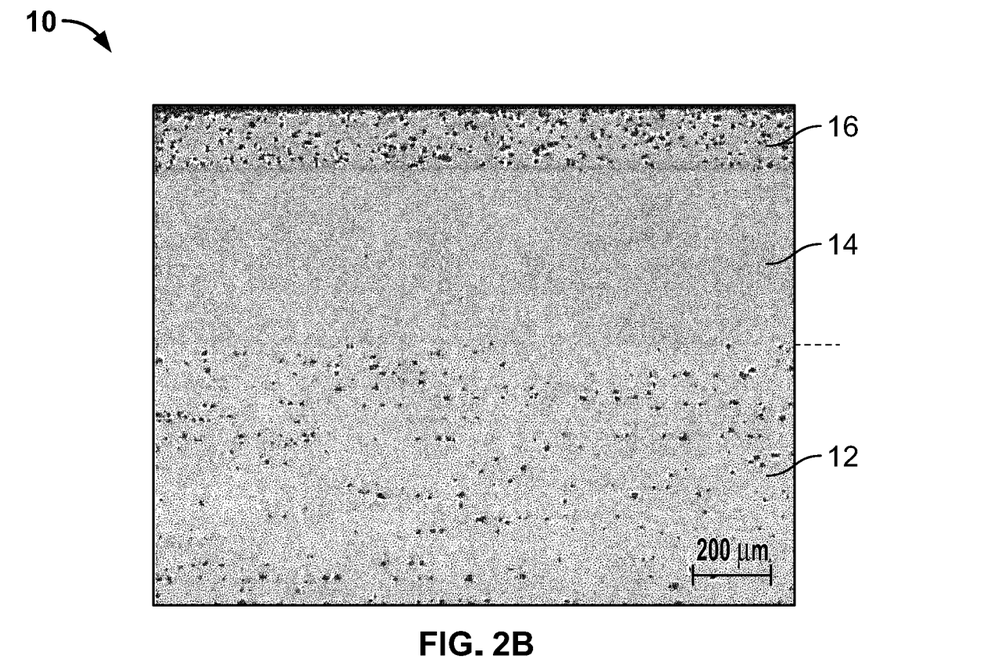
FIG. 2B is a cross-sectional view of a brazing sheet in accordance with an embodiment of the present disclosure.

FIGS. 2A and 2B show the microstructure of composite samples of brazing sheet 20 and 10 shown in FIGS. 1B and 1A, respectively, with FIG. 2A showing the LMP layer 26 as an interliner and FIG. 2B showing the LMP layer 16 as an outer liner. The samples were made in a lab scale hot rolling and cold rolling process using processing parameters similar to the fabrication process of commercial production. The LMP layers 16 and 26, the braze liners 14 and 24 and the cores 12, 22 bonded well with their respective adjacent laminae without any defects.

Solidus and liquidus for exemplary compositions of core alloys in accordance with the present disclosure were tested and the results are shown in Table 3. Some of the core alloys, e.g., C3, C4 and C10 contain high levels of Mg that would be challenging to braze in a CAB process with Nocolok flux. Some of the core alloy compositions contain high Cu and Mg, e.g., C3 and C10 that would have a low melting point and which would be expected to start melting during a CAB process.

TABLE 2

Example of Compositions of CBLs

| Alloy | Si | Fe | Cu | Mn | Mg | Cr | Zn | Ti | Solidus(° C.) | Liquidus(° C.) |
|---|---|---|---|---|---|---|---|---|---|---|
| CBL1 | 10.2 | 0.18 | 0.57 | 0.04 | 0.01 | 0.01 | 5.34 | 0.01 | 556 | 580 |
| CBL2 | 10.2 | 0.19 | 0.68 | 0.06 | 0.01 | 0.01 | 4.04 | 0.01 | 558 | 583 |

TABLE 3

Compositions of Core Alloys

| Alloy | Si | Fe | Cu | Mn | Mg | Cr | Zn | Ti | Solidus(° C.) | Liquidus(° C.) |
|---|---|---|---|---|---|---|---|---|---|---|
| C1 | 0.67 | 0.5 | 0.48 | 1.25 | 0.35 | 0.01 | 0.01 | 0.15 | 614 | 675 |
| C2 | 0.68 | 0.21 | 0.51 | 0.49 | 0.70 | 0.01 | 0.002 | 0.15 | 599 | 671 |
| C3 | 0.60 | 0.20 | 0.51 | 0.10 | 0.75 | 0.01 | 0.002 | 0.16 | 601 | 676 |
| C4 | 0.14 | 0.31 | 0.03 | 0.88 | 1.83 | 0.01 | 0.01 | 0.17 | 618 | 683 |
| C5 | 0.52 | 0.20 | 1.53 | 1.52 | 0.25 | 0.01 | 0.002 | 0.15 | 608 | 676 |
| C6 | 0.54 | 0.21 | 1.87 | 1.53 | 0.25 | 0.01 | 0.003 | 0.14 | 599 | 670 |
| C7 | 0.10 | 0.20 | 2.2 | 1.23 | 0.24 | 0.01 | 0.001 | 0.15 | 602 | 675 |
| C8 | 0.10 | 0.20 | 2.51 | 1.21 | 0.24 | 0.01 | 0.001 | 0.15 | 595 | 675 |
| C9 | 0.5 | 0.25 | 2.5 | 0.9 | 0.35 | 0.01 | 0.01 | 0.14 | 581 | 669 |
| C10 | 0.52 | 0.17 | 0.81 | 1.18 | 0.92 | 0.001 | 0.02 | 0.12 | 604 | 654 |
| C11 | 0.70 | 0.17 | 0.45 | 1.19 | 0.9 | 0.001 | 0.001 | 0.12 | 605 | 654 |

In one embodiment, the core has a composition having 0.10-1.2 wt. % Si, 0.15-0.5 wt. % Fe, 0.40-3.5 wt. % Cu, 0.10-1.8 wt. % Mn, 0.20-1.85 wt. % Mg, ≤0.01 wt. % Cr, ≤0.2 wt. % Zn and ≤0.2 wt. % Ti and wherein the core has a solidus of >590° C. and a liquidus >650° C.

In another embodiment, the core has 0.10-1.0 wt. % Si, 0.15-0.5 wt. % Fe, 0.40-3.0 wt. % Cu, 0.10-1.7 wt. % Mn, 0.20-1.5 wt. % Mg, ≤0.2 wt. % Zn and ≤0.2 wt. % Ti and has a solidus of >590° C. and a liquidus >650 C.

In one embodiment, the core has at least one strengthening element selected from Mg, Cu, Si, Mn.

Figure 3A:
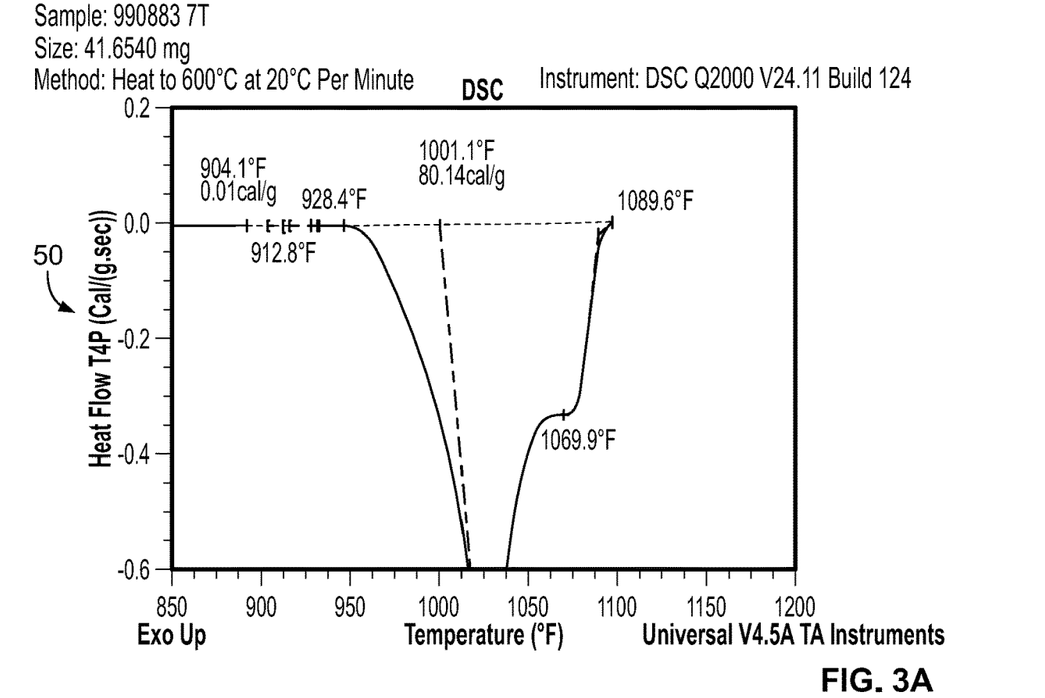
FIG. 3A is a graph of a differential scanning calorimetry (DSC) test on a low melting point alloy in accordance with an embodiment of the present disclosure.
Figure 3B:
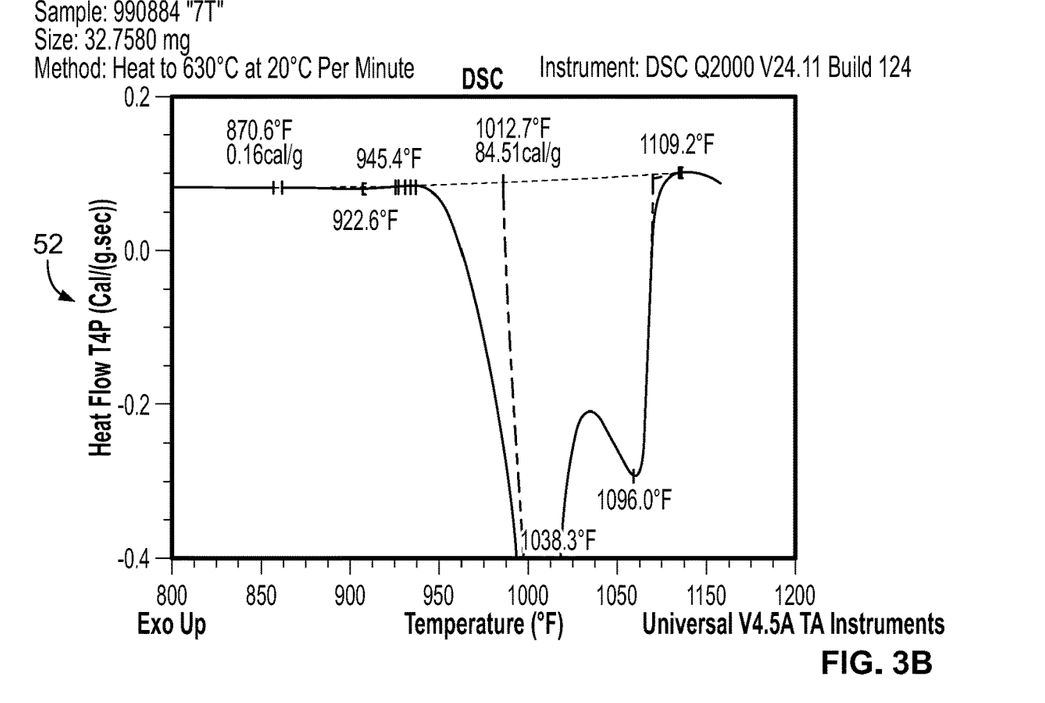
FIG. 3B is a graph of a differential scanning calorimetry (DSC) test on a low melting point alloy in accordance with an embodiment of the present disclosure.

In another embodiment, the Mg is present in the core in the amount of 0.2 to 0.8 wt. %, the Cu is in the amount of 1.5 to 2.5 wt. %, the Si 0.2-1.0 FIGS. 3A and 3B show graphs 50, 52, respectively, showing the results of differential scanning calorimetry (DSC) tests that were performed to measure the melting point of two low melting point aluminum alloys (LMPs), i.e., alloys L1 and L2 in Table 1, respectively. In the DSC tests graphed in FIGS. 3A, 3B, 4A, 4B, 5A and 5B heating was conducted at a rate of 20° C. per minute. The graph 50 in FIG. 3A shows the heat flow started at 928.4 F (497 C) indicating alloy L1 started melting. The heat absorption reached a peak at 1001.1 F (538 C), indicating a large amount of LMP metal melting. After that, the heat absorption started to diminish, but then started to rise to another peak at 1069 F (576 C) likely where the remaining Al—Si eutectic started melting. The melt completed at 1089.6 F (588 C).

Graph 52 of FIG. 3B shows that the melting of alloy L2 started at 945.4 F (507 C) and reached a peak at 1012.7 F (545 C). The melting of the metal slowed down and then started a second peak at 1068 F (575.5 C) where the Si eutectic started melting. The melting of the composite braze liner completed at 1109.2 F (598 C).

Table 4 shows DSC test results for 4-layer material samples. Sample A had CBL1 (of Table 2) on one side of the core C3 (Table 3) and 4047 on the other side. Sample B had CBL2 (Table 2) on one side of the core and 4047 on the other. The clad ratio of both CBL1 and CBL2 and the 4047 layer was 15% and the core was alloy C3 of Table 3. The laminate structure and composition of the samples A and B are shown in Table 4 expressed in weight percent, aluminum remainder.

TABLE 4

Compositions of Samples A and B

| Sample | Alloy | Si | Fe | Cu | Mn | Mg | Cr | Zn | Ti |
|---|---|---|---|---|---|---|---|---|---|
| A | 4047 | 12.1 | 0.17 | 0.002 | 0.004 | 0.001 | 0.002 | 0.01 | 0.008 |
|  | L1 | 5.1 | 0.12 | 2.0 | 0.09 | 0.01 | 0.01 | 19.9 | 0.01 |
|  | C3 | 0.60 | 0.20 | 0.51 | 0.10 | 0.75 | 0.01 | 0.002 | 0.16 |
|  | 4047 | 12.1 | 0.17 | 0.002 | 0.004 | 0.001 | 0.002 | 0.01 | 0.008 |
| B | L2 | 5.1 | 0.16 | 2.4 | 0.10 | 0.01 | 0.01 | 15.0 | 0.01 |
|  | 4047 | 12.1 | 0.17 | 0.002 | 0.004 | 0.001 | 0.002 | 0.01 | 0.008 |
|  | C3 | 0.60 | 0.20 | 0.51 | 0.10 | 0.75 | 0.01 | 0.002 | 0.16 |
|  | 4047 | 12.1 | 0.17 | 0.002 | 0.004 | 0.001 | 0.002 | 0.01 | 0.008 |

The samples A and B of Table 4 were prepared by assembling the liners and core together; reheating to a hot rolling temperature; hot rolling at a temperature in the range of 450-515 C; cold rolling to a thin gauge for either an anneal then roll to the final gauge or a final anneal.

The samples A and B of Table 4 were prepared by assembling the liners and core together; reheating to a hot rolling temperature; hot rolling at a temperature in the range of 450-515 C; cold rolling to a thin gauge for either an anneal then roll to the final gauge or a final anneal.

Figure 4A:
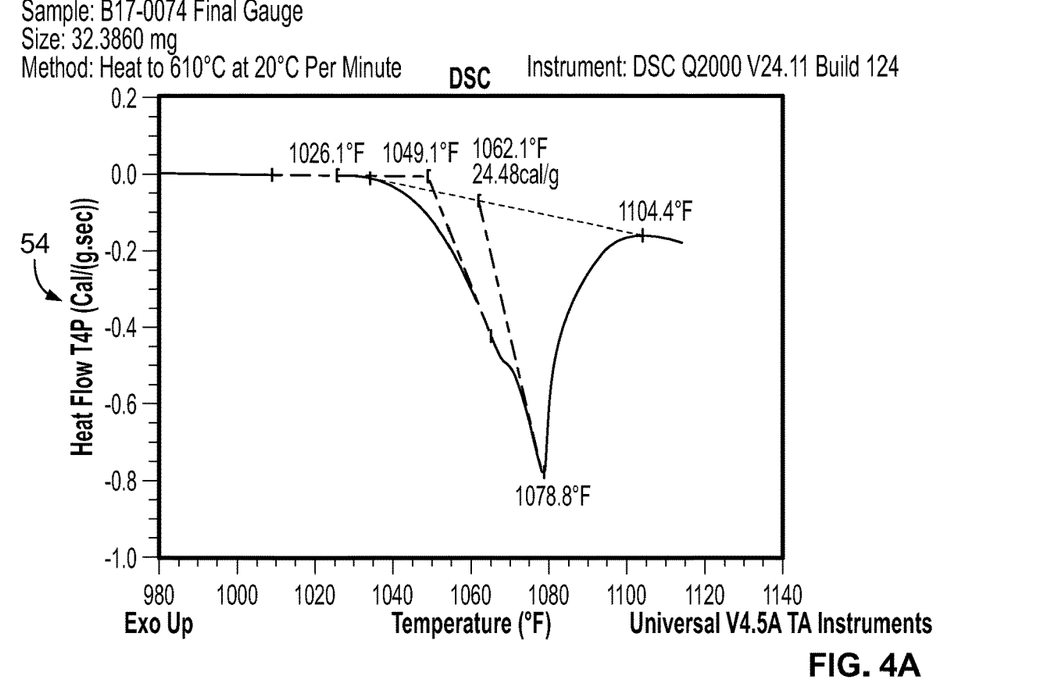
FIG. 4A is a graph of a differential scanning calorimetry (DSC) test on a four-layer brazing sheet having a low melting point alloy in accordance with an embodiment of the present disclosure.

FIG. 4A shows DSC results for Sample A in graph 54, where the first melt (interliner) of sample A with CBL1 started at 1026.1 F (552.3 C) and the second melt started at about 1062.1 F (572.2 C). The braze liner melt of sample A, including CBL1 on one side and 4047 on the other side, completed at 1104.4 F (598 C).

Figure 4B:
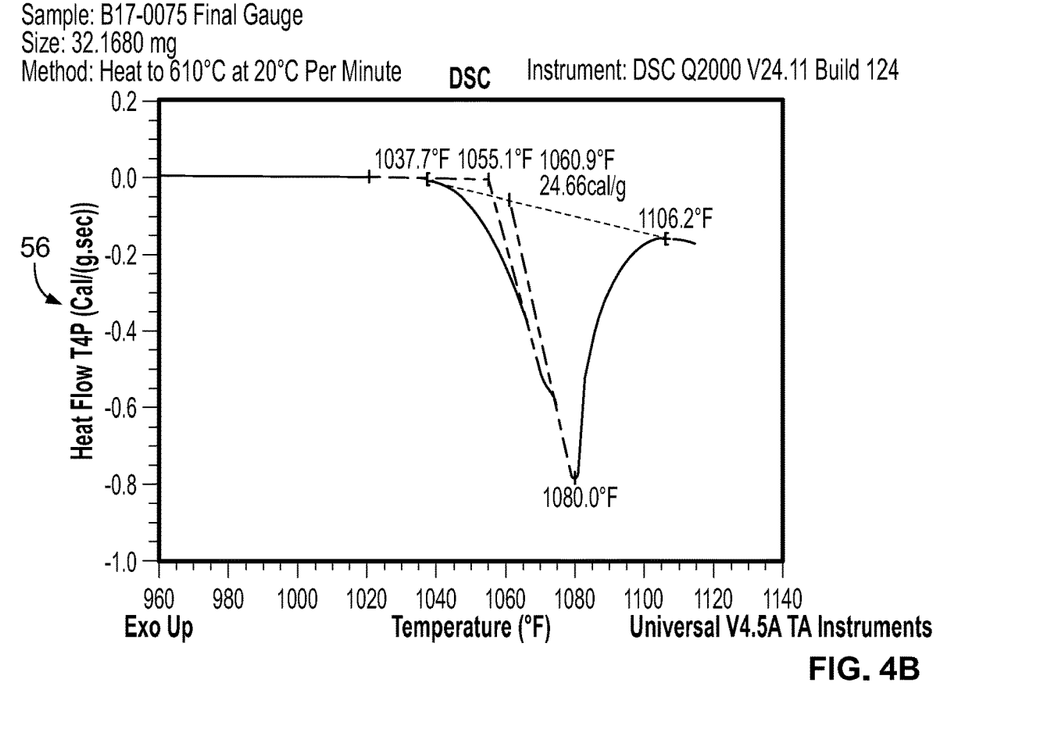
FIG. 4B is a graph of a differential scanning calorimetry (DSC) test on a four-layer brazing sheet having a low melting point alloy in accordance with an embodiment of the present disclosure.

FIG. 4B shows DSC results for sample B in graph 56, where the first melt (interliner) started at 1037.7 F (559 C) and the second melt started at about 1060.9 F (571.6 C). The melt of the braze liner for sample B including both CBL and 4047 completed at 1106.2 F (596.8 C).

As shown in graphs 54 and 56, the LMP layer in the composite starts to melt at a temperature higher than the monolithic alloy due to a composition change associated with diffusion of alloying elements such as Cu, Zn, etc. during both fabrication and brazing processes. As noted above, the liquid metal melting initiated at 552-559 C may accelerate the dissolution of Si in the 4047 braze liner and Cu/Zn diffused into the 4047 liner will lower the melting point of the liner such that the braze liner can start melt at a lower temperature.

Figure 5A:
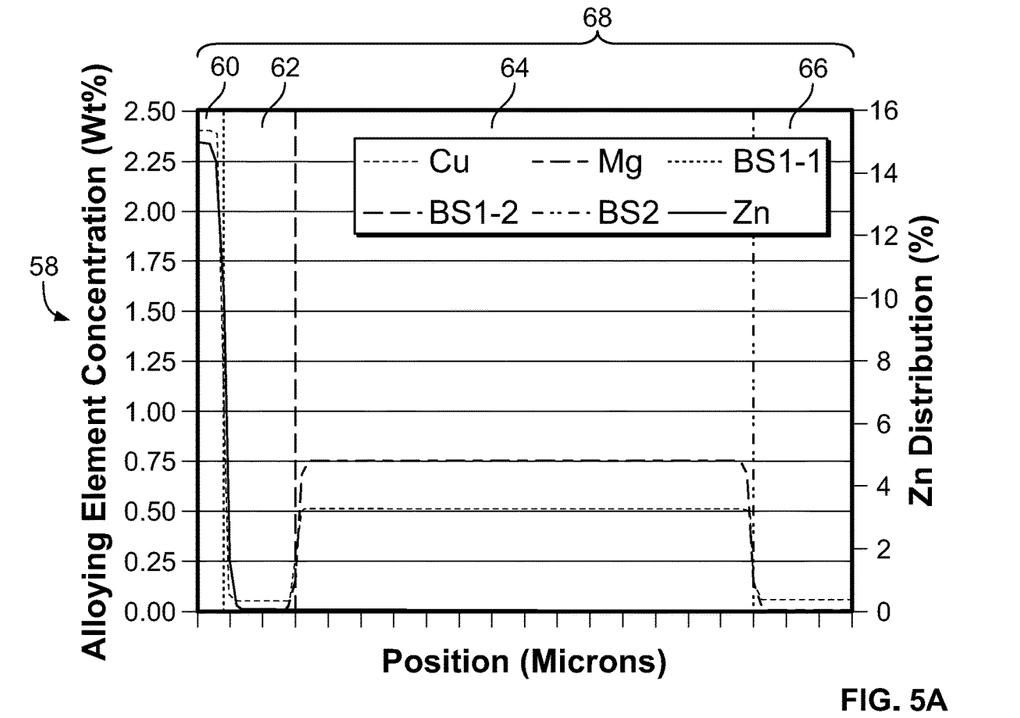
FIG. 5A is a graph of element distribution within a composite four-layer brazing sheet having a low melting point alloy in accordance with an embodiment of the present disclosure, prior to brazing.

FIG. 5A shows a graph 58, of pre-braze alloying element distribution in the layers: LMP 60, braze liner 62, core 64 and braze liner 66 of a clad brazing sheet 68, such as Sample A in Table 4. The LMP 60 and the braze liner 62 result in a composite braze liner CBL 18 (FIG. 1A), where the low melting point liner 60, is an outer liner. The Cu and Zn levels are high in the thin layer of the LMP liner 60.

Figure 5B:
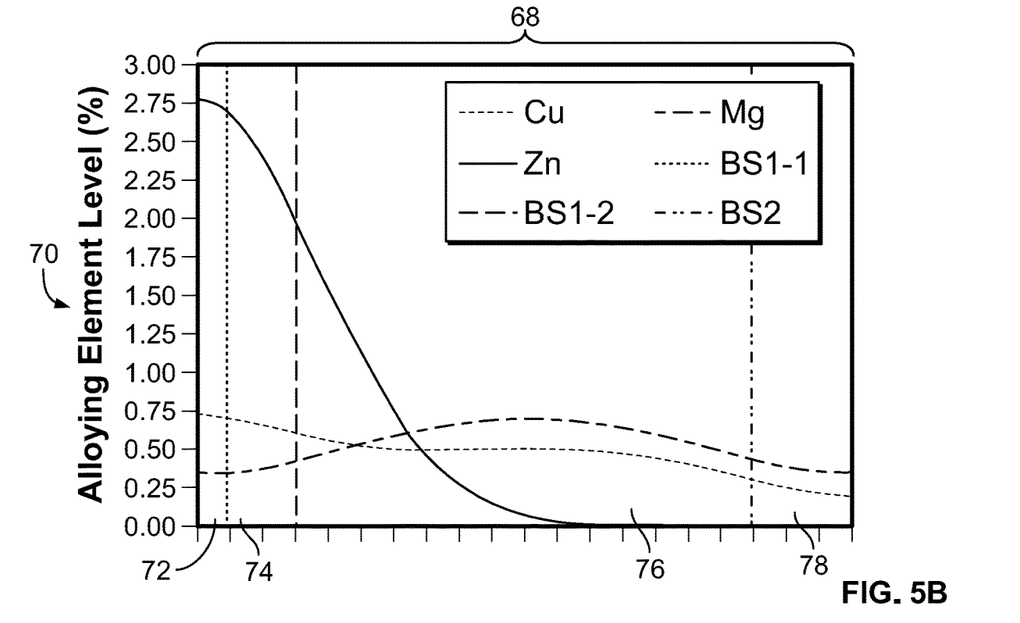
FIG. 5B is a graph of element distribution within the composite four-layer brazing sheet of FIG. 5A, after brazing.

The alloying element distribution of the post braze sample (Sample B of Table 4) is shown in FIG. 5B, where layers 72, 74, 76 and 78 correspond to layers LMP 60, braze liner 62, core 64 and braze liner 66 of FIG. 5A, but in a post-brazed state. The diffusion was simulated based on the solid-state diffusion in the braze thermal cycle, and the Zn and Cu levels were significantly lower than the initial levels in the pre-braze state. These Cu and Zn levels suggest an acceptable level of corrosion resistance. The alloying element distribution of an actual post braze sample was in good agreement with the simulation. Zn is 15% and Cu about 2.35% on the surface in 5A, but Zn is 2.3-2.4% and Cu 0.65-0.7% on the surface in 5B.

Figure 6:
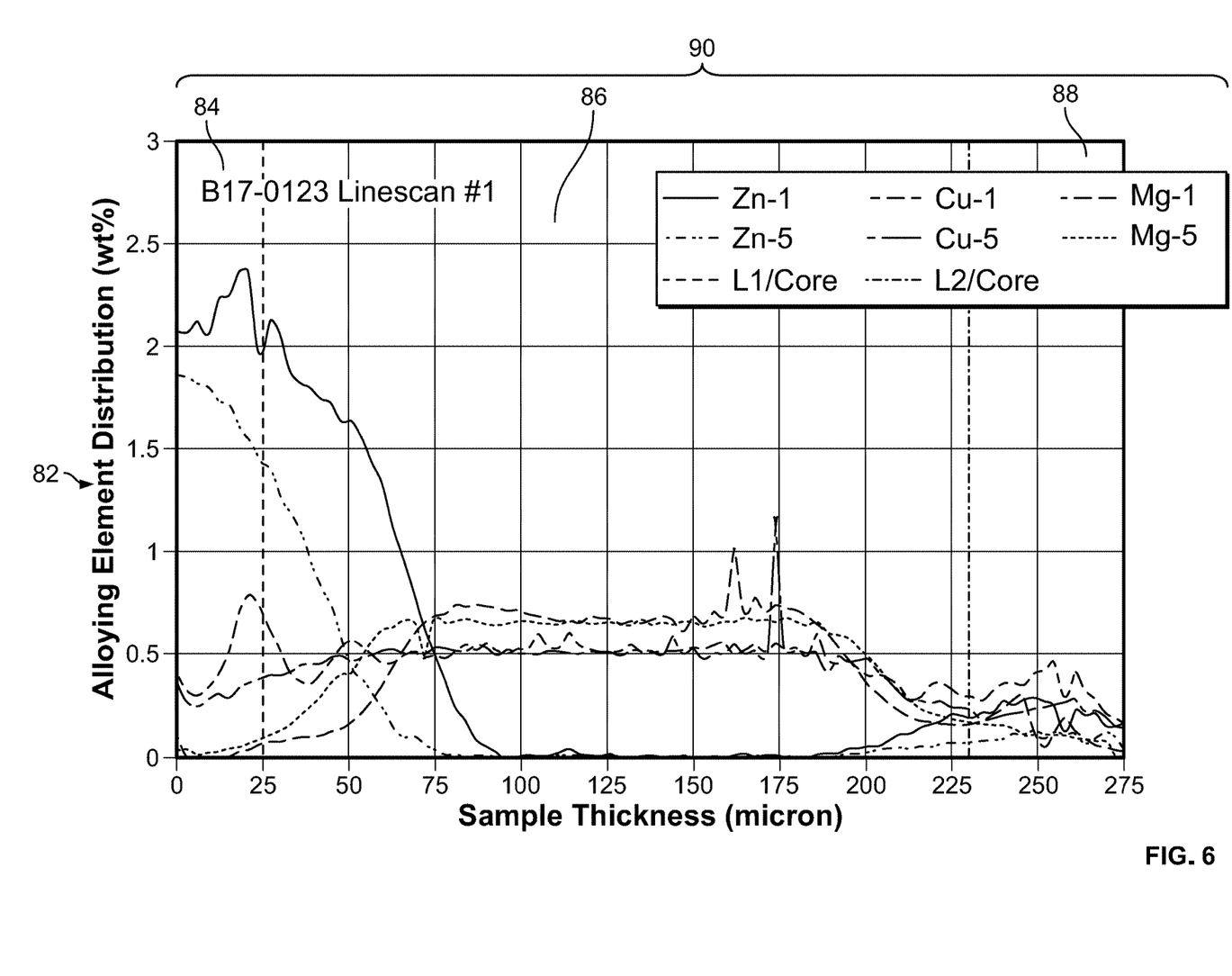
FIG. 6 is a graph of distribution of elements Cu, Zn and Mg in the brazing sheet of FIG. 5B, after brazing.

FIG. 6 shows a graph 82 of the post-braze Cu, Mg and Zn distribution within layers CBL 84, core 86 and inner braze liner 88 of a brazing sheet 90, where the LMP liner has composition L2 of Table 1 and alloy C3 of Table 2 was used as the core alloy with an outer clad liner of 4047 alloy. Locations on two sides of a braze joint formed between adjacent brazing sheets 90 were tested (designated as −1 and −5 in the key of FIG. 6).

Figure 7:
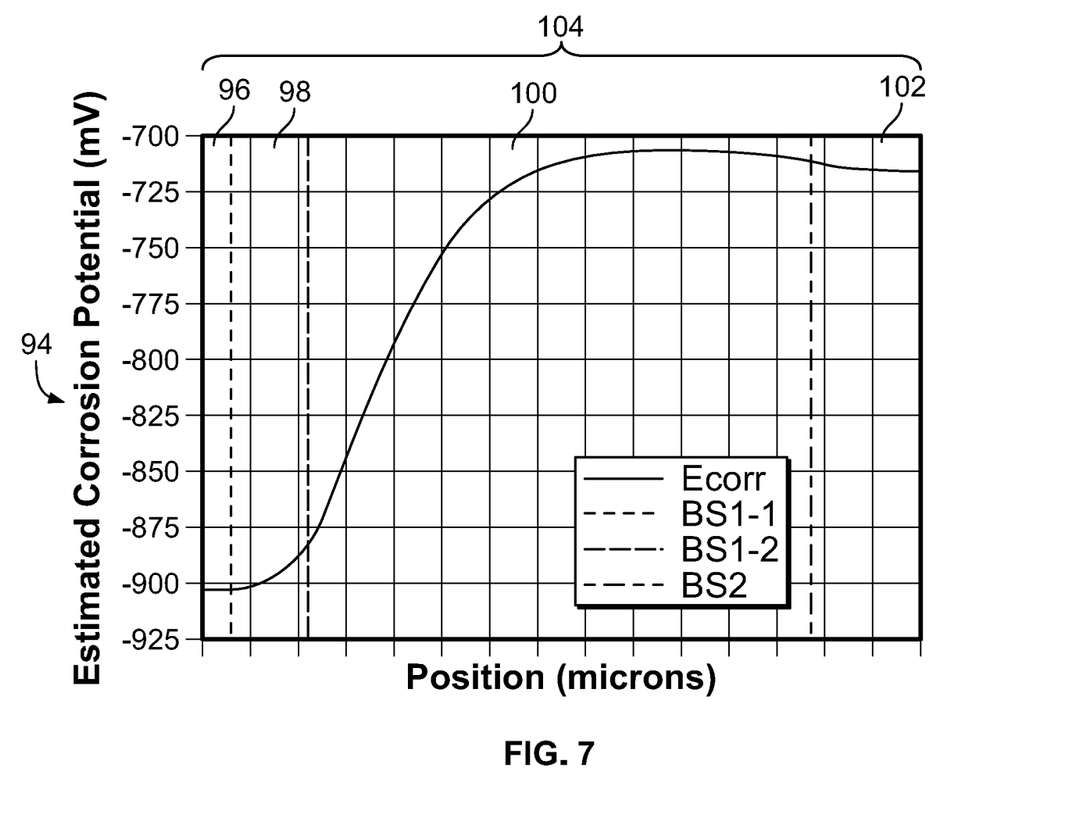
FIG. 7 is a graph of corrosion potential within the composite brazing sheet of FIG. 6.

FIG. 7 shows a graph 94 of the corrosion potential distribution in a composite brazing sheet material 104 with an LMP layer 96 and 4000 series layer 98 (forming CBL 2 of Table 2) as an outer liner, a core 100 and an outer liner 102 of 4000 series alloy. To assess the corrosion performance of the post braze material 104, the corrosion potential was simulated based on the alloying element distribution of the post braze material. The corrosion potential on the surface of the sample has a corrosion potential of about −900 mv, which is anodic to the core and therefore can provide good corrosion protection to the core.

The present disclosure discloses a new material, known as a CBL, that has a thin layer of LMP aluminum alloy bonded with normal 4XXX braze liner alloys, such as 4343, 4045, 4047, etc. At an early stage of the braze process, before the LMP aluminum liner starts to melt, the alloying elements, such as Cu and Zn, will diffuse into the adjacent 4XXX braze liner, which lowers the melting point of the 4XXX braze liner alloy. When the low melting alloy layer starts to melt at, for instance, around 510° C., the liquid metal can accelerate the Si eutectic melt because Si diffusion in the liquid metal is much faster than in the solid metal. In this way the 4XXX braze liner can get melted quickly at a temperature lower than its eutectic temperature, i.e., 577° C.

In accordance with the present disclosure, a braze process was developed to braze samples at a low temperature. The samples were subjected to a short brazing cycle of about 8-12 minutes, with heating to a temperature around 560 C to 575+/−5 C. In a short braze cycle at a low temperature, less Mg diffusion from the core to the brazing surface occurs, which reduces the formation of Mg oxide and the reaction between Mg and F/K in the flux. The reduction of Mg diffusion relative to brazing at higher temperatures and/or for longer times facilitates the operation of the Nocolok flux for high Mg containing core alloys, allowing it to effectively dissolve and remove the surface oxides that are present at the brazing surface.

Figure 8A:
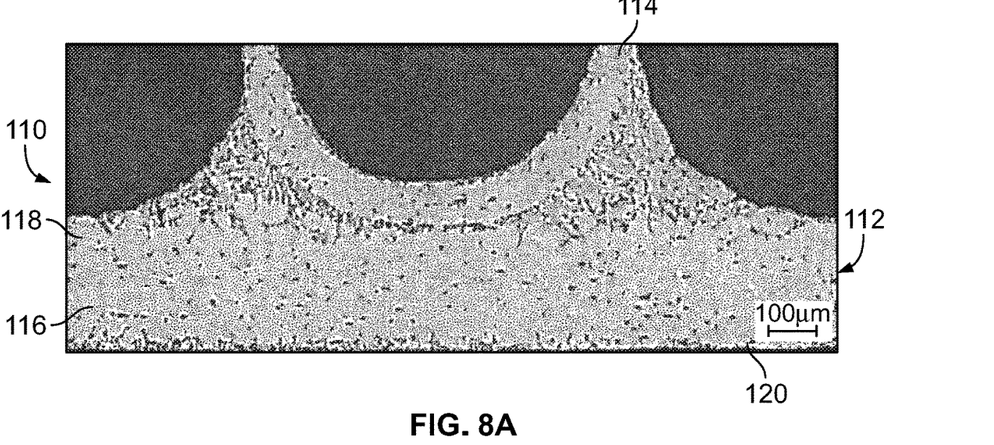
FIG. 8A is a cross-section of a braze joint formed by brazing a brazing sheet in accordance with an embodiment of the present disclosure.

FIG. 8A shows a braze joint 110 between a brazing sheet material 112 in accordance with the present disclosure and a non-clad fin 114. The brazing sheet 112 was formed with a CBL 118 having a layer of alloy L1 in Table 1 as an interliner, cladded over with 4047, on a first side of the core 116 in a total clad ratio of 15%. The core alloy was alloy C3 in Table 2. A braze liner 120 of 4047 alloy was clad on the second side of the core in a clad ratio of 15%. Corrugated, non-clad fins 114 were assembled on both sides of the brazing sheet 112 (only one side visible in FIG. 8A). The sample with fins was fluxed with Nocolok flux and brazed at 575° C. in a CAB process. Braze joints were formed on the composite braze liner CBL 118 side, as shown, but not on the opposite side of the core 116 (not shown), which was clad only with the 4047 liner.

Figure 8B:
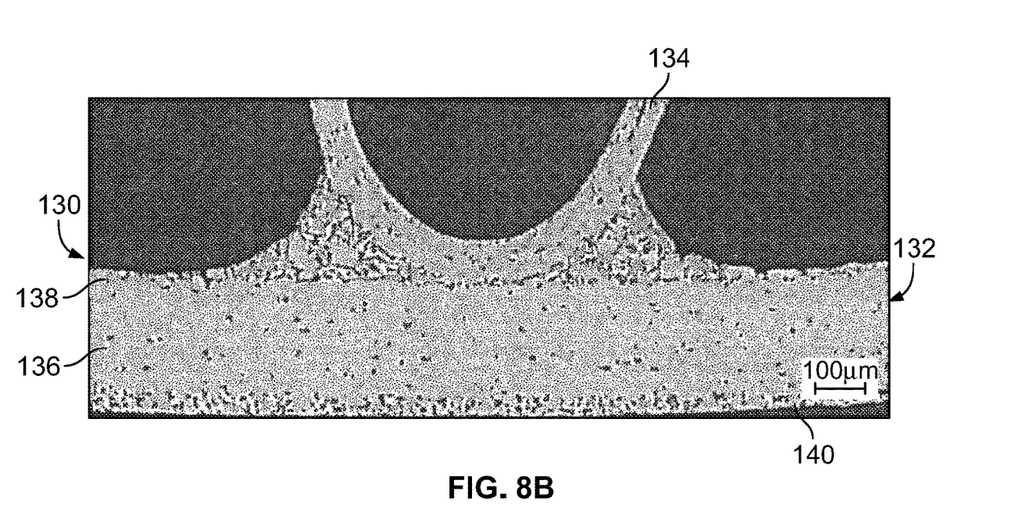
FIG. 8B is a cross-section of a braze joint formed by brazing a brazing sheet in accordance with an embodiment of the present disclosure.

FIG. 8B shows a braze joint 130 between a brazing sheet material 132 in accordance with the present disclosure and a non-clad fin 134. The brazing sheet 132 was formed with a CBL 138 having a layer of alloy L2 in Table 1, as an outer liner, cladded over 4047 braze liner, on a first side of a the core 136 in a total clad ratio of 15%. The core alloy was alloy C3 in Table 2. A braze liner 140 of 4047 alloy was clad on the second side of the core 136 in a clad ratio of 15%. Corrugated, non-clad fins 134 were assembled on both sides of the brazing sheet 132 (only one side visible in FIG. 8B). The sample with fins 134 was fluxed with Nocolok flux and brazed at 575° C. in a CAB process. Braze joints were formed on the composite braze liner CBL 138 side, as shown, but not on the opposite side of the core 136 (not shown), which was clad only with the 4047 liner. The CBL, e.g., 118, 138 can be roll bonded together in a hot rolling process with the other liners and core using a normal rolling process. It can also be formed by other technologies and processes, including but not limited to, coating technology to coat a layer of LMP aluminum alloy powder onto the 4XXX braze liner, thermal spray technology to spray a layer of LMP aluminum alloy onto the 4XXX braze liner, etc.

Sample materials in accordance with the present disclosure showed high post braze strength as shown in Table 5. The samples were made at 0.20 mm gauge or less with a 10% waterside liner containing high Zn ranging from 6% to 12 wt %. They were prepared either in H14 or H24 temper. The post braze samples of Table 5 were either natural aged or artificially aged.

TABLE 5

Pre and Post Braze Tensile Properties of Some Samples.

| | Pre Braze | | | Post Braze | | |
| --- | --- | --- | --- | --- | --- | --- |
| Sample | UTS(MPa) | TYS(MPa) | Elong(%) | UTS(MPa) | TYS(MPa) | Elong(%) |
| C2 | 212.4 | 196.2 | 4.3 | 240.5 | 148.7 | 6.6 |
| C5 | 224.4 | 190.8 | 9.3 | 251.5 | 115.6 | 12.3 |

TABLE 5-continued

Pre and Post Braze Tensile Properties of Some Samples.

| Sample | Pre Braze | | | Post Braze | | |
| --- | --- | --- | --- | --- | --- | --- |
| | UTS(MPa) | TYS(MPa) | Elong(%) | UTS(MPa) | TYS(MPa) | Elong(%) |
| C6 | 223.2 | 190.8 | 9.2 | 266.2 | 123.0 | 12.4 |
| C7 | 229.9 | 194.9 | 11.6 | 264.5 | 125.1 | 9.8 |
| C8 | 233.3 | 199.7 | 11.3 | 283.0 | 139.6 | 10.8 |
| C10 | 245.3 | 240.5 | 1.2 | 276.2 | 240.2 | 2.9 |
| C11 | 214.3 | 213.1 | 0.8 | 279.7 | 254.7 | 2.3 |

The compositional ranges given above for the LMP, the CBL and the core include all intermediate values. For example the compositional ranges for an embodiment of the LMP having a composition of 4.0-12.0 wt. % Si, 0.1-1.0 wt. % Fe, 1.0-5.0 wt. % Cu, ≤0.1 wt. % Mn and 5.0-20.0 wt. % Zn would include Si in amounts of 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, etc. in increments of 0.1 up to 12.0 and all intermediate values, Fe in amounts of 0.0, 0.1, 0.2, 0.3, 0.4, 0.5, 0.6, 0.7, 0.8, 0.9, 1.0-5.0 in 0.1 wt % increments or any intermediate value, Cu in amounts of 1.0-5.0 in increments of 0.5 wt % or any intermediate value, Mn in amounts of 0.0-0.1 in increments of 0.01, wt % or any intermediate value, Zn in amounts of 5.0, 5.5, 6.0. 6.5, 7.0, 7.5, 8.0, 8.5, 9.0, 9.5. 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5 or 20.0 wt % or any intermediate value.

In a further example of alternative embodiments in accordance with the present disclosure, the compositional ranges for an embodiment of the CBL with composition 4.0-12.0 wt. % Si, 0.1-1.0 wt. % Fe, ≤2.0 wt. % Cu, ≤0.1 wt. % Mn, 1.0-6.0 wt. % Zn would include all incremental intermediate values, e.g., varying by 0.01 wt. % for each element over the entire stated range, as in the preceding paragraphs.

In a further example of alternative embodiments in accordance with the present disclosure, the compositional ranges for an embodiment of the core with composition 0.10-1.2 wt. % Si, 0.15-0.5 wt. % Fe, 0.40-3.5 wt. % Cu, 0.10-1.8 wt. % Mn, 0.20-1.85 wt. % Mg, ≤0.2 wt. % Zn and ≤0.2 wt. % Ti would include all intermediate values for each element over the entire range, as in the preceding paragraphs.

The present disclosure describes a composite braze liner that enables brazing heat exchanger assemblies at temperatures lower than the temperatures widely used in the industry today. This low temperature brazing enables additions of property strengthening alloying elements, such as Si, Cu, Mg, etc., to a high level and tolerates the melting point drop. In addition, it also reduces energy expenditure in brazing heat exchanger assemblies.

In another embodiment, the present disclosure enables high Mg containing brazing sheet products to be brazed using normal flux, such as Nocolok flux, in a controlled atmosphere braze (CAB) process to achieve high strengths. In another embodiment, the compositions and clad ratios of the composite braze liner can be designed to achieve a material with superior corrosion-resistance properties.

The present disclosure utilizes standard abbreviations for the elements that appear in the periodic table of elements, e.g., Mg (magnesium), O (oxygen), Si (silicon), Al (aluminum), Bi (bismuth), Fe (iron), Zn (zinc), Cu (copper), Mn (manganese), Ti (titanium), Zr (zirconium), F (fluorine), K (potassium), Cs (Cesium), etc.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated. All such variations and modifications are intended to be included within the scope of the appended claims.

We claim:

1. A brazing sheet, comprising:
   a core of a 2XXX, 3XXX, 5XXX or 6XXX aluminum alloy;
   a composite braze liner adjacent the core, wherein the composite braze liner comprises:
   a 4XXX aluminum alloy layer; and
   a first aluminum alloy layer connected to the 4XXX aluminum alloy layer;
   wherein the first aluminum alloy layer has a melting point lower than that of the 4XXX aluminum alloy layer; and
   wherein the first aluminum alloy comprises 4-12 wt. % Si, 0.1-1.0 wt. % Fe, 1.0-5 wt. % Cu and 5-20 wt. % Zn.

2. The brazing sheet of claim 1, wherein the 4XXX aluminum alloy layer is disposed on the core, and wherein the first aluminum alloy layer is disposed on the 4XXX aluminum alloy layer.

3. The brazing sheet of claim 1, wherein the first aluminum alloy layer is disposed on the core, and wherein the 4XXX aluminum alloy layer is disposed on the first aluminum alloy layer.

4. The brazing sheet of claim 1, comprising a waterside liner.

5. The brazing sheet of claim 4, wherein the waterside liner comprises 1.0-15 wt. % Zn.

6. The brazing sheet of claim 1, wherein the first aluminum alloy layer has a solidus temperature of not greater than 560° C.

7. The brazing sheet of claim 1, wherein the core has a solidus temperature of greater than 590° C., and wherein the core has a liquidus temperature of greater than 650° C.

8. The brazing sheet of claim 7, wherein the core comprises 0.10-1.2 wt. % Si, 0.15-0.5 wt. % Fe, 0.40-3.5 wt. % Cu, 0.10-1.8 wt. % Mn, 0.20-1.85 wt. % Mg, <0.01 wt. % Cr, <0.20 wt. % Zn and <0.20 wt. % Ti.

9. A method comprising:
   providing a first part formed from a brazing sheet, wherein the brazing sheet comprises:
   a core of a 2XXX, 3XXX, 5XXX or 6XXX aluminum alloy;
   a composite braze liner adjacent the core, wherein the composite braze liner comprises:
   a 4XXX aluminum alloy layer; and
   a first aluminum alloy layer connected to the 4XXX aluminum alloy layer;
   wherein the first aluminum alloy layer has a melting point lower than that of the 4XXX aluminum alloy layer; and
   wherein the first aluminum alloy comprises 4-12 wt. % Si, 0.1-1.0 wt. % Fe, 1.0-5 wt. % Cu and 5-20 wt. % Zn;
   providing a second part formed from an aluminum alloy;
   applying a Nocolok flux to at least one of the first part and the second part to remove oxides from a surface thereof;
   placing the first part in contact with the second part;
   heating the first part and the second part in a controlled atmosphere;
   melting the first aluminum alloy layer before the 4XXX aluminum alloy melts;
   melting the 4XXX aluminum alloy layer, thereby forming a mixed molten alloy of the first aluminum alloy and the 4XXX aluminum alloy;
   forming a braze joint between the first part and the second part from the mixed molten alloy; and
   allowing the mixed molten alloy to cool.

* * * * *